United States Patent Office 3,439,097
Patented Apr. 15, 1969

---

3,439,097
COMPOSITIONS AND A METHOD FOR THE PREVENTION AND CONTROL OF HISTOMONIASIS WHICH EMPLOY A 5-NITROIMIDAZOLE AND A BENZENEARSONIC ACID
Robert D. Vatne and Robert R. Baron, Charles City, Iowa, assignors to Salsbury Laboratories, a corporation of Iowa
No Drawing. Continuation-in-part of application Ser. No. 479,601, Aug. 13, 1965. This application Jan. 29, 1968, Ser. No. 701,133
Int. Cl. A61k 27/00
U.S. Cl. 424—273        10 Claims

ABSTRACT OF THE DISCLOSURE

An improved remedy for the prevention and control of histomoniasis. The remedy consists of a synergistic composition which comprises a mixture of a 5-nitroimidazole as the active ingredient and a benzenearsonic acid as synergizer. The composition is administered to gallinaceous fowl in medicated feed rations which are consumed by the birds ad libitum.

---

Cross reference related

This application is a continuation-in-part application, S.N. 479,601 filed Aug. 13, 1965, now abandoned.

This invention relates to improvements in veterinary medicine, and particularly to the prevention and control of gastro-intestinal infections of protozoal origin in poultry. More specifically the present invention pertains to the prophylactic and remedial treatment of gallinaceous fowl against Blackhead which is also known to the veterinarian as histomoniasis or infectious enterohepatitis because of the cecal and hepatic involvements in its clinical manifestations. The etiological factor of the disease is a microscopic flagellate protozoon identified as *Histomonas meleagridis*. The parasite is mostly harbored by the common poultry cecal worm *Heterakis gallinae*, and its eggs in which it is able to live for extended periods of time. It is mainly this source of infection which is responsible for the transmission of the disorder.

Histomoniasis occurs in turkeys of all ages and may also affect a wide variety of other avian species, such as chickens, guineas, quails, partridges, pheasants and peafowl. The birds contract the disease by consuming feed or water contaminated with the droppings carrying the infectious organism, or by swallowing cecal worms or their eggs harboring the parasite. The prognosis of the disease, especially in turkeys, is most unfavorable. Mortality is high and sometimes attains a rate of 100% of the flock. The heaviest losses occur during the first three months of life, but are not limited to that age. Very frequently an outbreak is observed during the breeding season. The birds which do not succumb to the disease remain stunted in their growth and display an excessive wasting of flesh. Annual losses due to turkey mortality and emaciation amount to several million dollars.

In view of the destructive effect of histomoniasis upon the poultry industry a long and continuing search for a chemotherapeutic prophylactic and curative treatment of the disease has been a prime concern of the veterinary profession. A variety of drugs have been suggested for this purpose with more or less encouraging results, the main objective being to find a remedial agent of adequate potency, a favorable therapeutic index and reasonable cost at effective dosage levels.

Among the drugs more recently employed with promising results is a series of compounds which are derivatives of 5-nitroimidazole and have the following configuration:

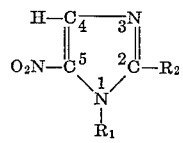

wherein $R_1$ and $R_2$ stand for hydrogen or a lower alkyl and either one or both R values are substituted by a lower alkyl radical. Particularly beneficial action has been shown by the 1,2-dimethyl-5-nitroimidazole, also hereinafter generically referred to as dimetridazole, and by the 1-methyl-5-nitroimidazole. One of the shortcomings of these two chemicals is that they are expensive to make and accordingly not sufficiently economical to be used by the poultry raiser in the required effective amounts. In addition, an improved ratio between the therapeutic dose response and toxicity level of these drugs would still be desirable to afford maximum safety even in case of an accidental overdose.

According to the present invention we have found that the therapeutic activity of the aforesaid 5-nitroimidazoles can be materially potentiated when they are dispensed in conjunction with one or more benzenearsonic acids of the following formula:

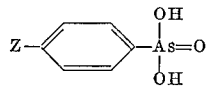

wherein Z stands for —$NH_2$, —$NO_2$, or

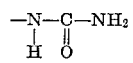

It may thus be seen that the synergistic activators, which in themselves may, but need not have some histomonicidal effect, are comprised of p-aminobenzenearsonic acid, also known as arsanilic acid, p-nitrobenzenearsonic acid, and p-ureidobenzenearsonic acid. While the description and the following examples illustrate the acids for the purpose of this disclosure, it will be understood that their non-toxic salts are likewise included within the scope of this invention and shall be covered by the claims as obvious equivalents. Salts of the type as described comprise those of the alkali metals, ammonium, alkaline earth metals, such as calcium and barium, and furthermore iron, copper and cobalt. Also one or both hydroxyl groups in the arsonic acid portion may be esterified by a lower alkyl alcohol and such esters are deemed to be equivalent to the claimed synergistic acids.

The new combinations according to our invention have been extensively and successfully tested on *Histomonas meleagridis* infections in young turkeys. It is apparent, however, that the experiments conducted on this gallinaceous species are given by way of illustration only and are not to be construed as limitative as far as other avian varieties are concerned.

The synergistic combinations of a 5-nitroimidazole with one or more of the aforementioned benzenearsonic acids are applied by introducing the same into the animal organism in any form or manner susceptible of building up and maintaining an effective blood or tissue level. This can be accomplished either by injection or by dispensation of suitable dosage units in capsules or tablets. As preferred embodiment, however, the compositions are administered to the birds as homogeneously dispersed additives to inert and non-toxic nutritive materials of sustenance which are absorbed by or taken into the body of the treated bird and serve for the purpose of growth, work and repair and for the maintenance of the vital processes. Suitable carriers of ingestible nature are any kind of food material, and primarily ground corn, corn meal, dried distiller's grain, mash, scratch, and any other normal or commercial rations. The so medicated feed rations are placed before the birds for consumption ad libitum. The synergistic remedies may also be administered in liquid compositions which can be conveniently prepared, for instance, from drinking water in which they are dissolved or suspended by means of skim milk, edible oils, syrups, wetting agents and emulsifiers.

In the feed, the 5-nitroimidazoles may be dispensed within the dosage range of 0.0019 to 0.011% by weight, while the synergizers may be present in proportions from 0.0063 to 0.0188% of p-nitrobenzenearsonic acid, from 0.0094 to 0.0375% of p-ureidobenzenearsonic acid, and from 0.0025 to 0.01% of arsanilic acid.

It has been further established as borne out by the table hereinbelow that the effective weight ratios between 1,2-dimethyl-5-nitroimidazole and p-nitrobenzenearsonic acid in terms of percentages in the feed lie in the approximate range of 0.5:5 to 9:5. Thus, for instance, a 100% effective combination of 0.0019% of 1,2-dimethyl-5-nitroimidazole and of 0.0188% of p-nitrobenzenearsonic acid contains these ingredients in a proportional relationship of 0.0019/0.0188 corresponding to a ratio of 0.10106/1 or 0.5:5. At the opposite dosage margin, in equally active compositions of 0.0110% of 1,2-dimethyl-5-nitroimidazole and 0.0063% of p-nitrobenzenearsonic acid the dimetridazole and its potentiator would stand to each other in a ratio of 0.0110/0.0063 which corresponds to 1.746/1 or roughly 9:5. Similarly the active weight ratios between dimetridazole and p-ureidobenzenearsonic acid are comprised within the approximate range of 1:5 to 4:5. If 0.0075% of dimetridazole are combined with 0.0375% of the arsonic acid, the quotient is 0.0075/0.0375=0.2/1 or 1:5. If the amount of the synergizer is 0.0094%, the ratio would be 0.0075/0.0094=0.8/1 or 4:5.

Correspondingly, in a combination of 0.0075% of dimetridazole with 0.01% arsanilic acid the ratio would be 0.0075/0.01 or approximately 4:5. If the dosage of the potentiator is lowered to 0.0025%, the proportional relationship would be 0.0075/0.0025=3/1 or 15:5. In a like manner the approximate range of the effective weight ratios and a combination of 1-methyl-5-nitroimidazole with p-nitrobenzenearsonic acid can be computed as 1:5 to 2:5 on the basis of the experimental data listed in the table. It follows from the foregoing figures that the overall weight ratios between the histomonicidal dimetridazole and its activators lie between 0.5:5 and 15:5.

The following example will illustrate the synergistic activity of our new Blackhead control compositions, and since the virulence of this infectious disorder is so strikingly manifested by its toll of fatalities, the experimental results have been evaluated and expressed in terms of survival ratios in response to the chemotherapeutic treatments.

Altogether 560 birds were used in the experiments. In each of the trials, an even number of Broad Breasted Bronze poults were reared in wire-bottomed cages enclosed in brooding rooms. They were vaccinated against Newcastle Disease and at the age of 4 to 10 weeks placed in individual cages where they remained for one or two days prior to the initiation of the test. The lots were thereupon divided into the following 5 groups of equal numbers.

(1) Infected and treated with dimetridazole at a given dosage,
(2) Infected and treated with the synergist at a given dosage,
(3) Infected and treated with a mixture of dimetridazole and synergist at given dosages,
(4) Infected and untreated controls,
(5) Non-infected and untreated controls.

The treatment was carried out by placing the medicated rations containing the drugs in varying proportions before the infected birds for ingestion ad libitum. The poults were first orally infected with approximately 1,000 embryonated eggs of *Heterakis gallinarum* and then received the medicated feed for 21 days. They were held under observation for an additional seven days on a nonmedicated diet to determine the extent of possible relapses. During all the experiments weights, feed-and water-consumption were duly recorded for each bird under test. The following table will summarize the results.

The first column identifies the test compounds in reference to their given dosage levels, to wit, the dimetridazole by letters A to F, and the synergizers by numerals 1 to 11. The different synergistic combinations at various proportions can thus be easily designated by associating a letter with a numeral, such as B5=dimetridazole at 0.011%+p-nitrobenzenearsonic acid at 0.0063%.

The second column lists the names of the chemicals employed in the experiments and is followed by column 3 for the feed concentration in percentages by weight. The fourth column indicates the efficacy in terms of survival ratios as compared with those in the infected untreated controls. If, for example, in a test series out of 49 infected and treated birds 46 animals survive the infection while all the controls succumb, the survival ratio percentage would be 46/49×100=94%.

The first dosage of dimetridazole represents an optimal level of histomonicidal activity which can be achieved by the compound without untoward side reactions. It has been recorded for the purpose of comparison with the synergistic combinations to demonstrate the full extent of their potentiating effect.

TABLE

| | Compound | Concentration, percent | Survival Ratio, percent |
|---|---|---|---|
| A | Dimetridazole | 0.0150 | 94 |
| B | do | 0.0110 | 60 |
| C | do | 0.0075 | 21 |
| D | do | 0.0049 | 0 |
| E | do | 0.0038 | 0 |
| F | do | 0.0019 | 0 |
| G | 1-methyl-5-nitroimidazole | 0.0025 | 0 |
| H | do | 0.0038 | 0 |
| 1 | p-Nitrobenzenearsonic acid | 0.0250 | 69 |
| 2 | do | 0.0188 | 60 |
| 3 | do | 0.0125 | 23 |
| 4 | do | 0.0083 | 0 |
| 5 | do | 0.0063 | 11 |
| 6 | p-Ureidobenzenearsonic acid | 0.0375 | 43 |
| 7 | do | 0.0188 | 0 |
| 8 | do | 0.0094 | 0 |
| 9 | Arsanilic acid | 0.0100 | 0 |
| 10 | do | 0.0050 | 0 |
| 11 | do | 0.0025 | 0 |
| C5 | Dimetridazole+p-nitrobenzenearsonic acid | 0.0075+0.0063 | 100 |
| C4 | do | 0.0075+0.0083 | 100 |
| C3 | do | 0.0075+0.0125 | 98 |
| E5 | do | 0.0038+0.0063 | 56 |

TABLE

| Compound | | Concentration, percent | Survival Ratio, percent |
|---|---|---|---|
| F2 | do | 0.0019+0.0188 | 100 |
| E2 | do | 0.0038+0.0188 | 100 |
| D2 | do | 0.0049+0.0188 | 100 |
| E3 | do | 0.0038+0.0125 | 63 |
| D3 | do | 0.0049+0.0125 | 100 |
| B5 | do | 0.0110+0.0063 | 100 |
| C6 | Dimetridazole+p-ureidobenzenearsonic acid | 0.0075+0.0375 | 100 |
| C7 | do | 0.0075+0.0188 | 100 |
| C8 | do | 0.0075+0.0094 | 75 |
| C9 | Dimetridazole+arsanilic acid | 0.0075+0.0100 | 62 |
| C10 | do | 0.0075+0.0050 | 64 |
| C11 | do | 0.0075+0.0025 | 50 |
| G5 | 1-methyl-5-nitroimidazole+p-nitrobenzenearsonic acid | 0.0025+0.0063 | 50 |
| G3 | do | 0.0025+0.0125 | 100 |
| H3 | do | 0.0038+0.0125 | 100 |

The tabulated figures demonstrate the striking synergistic potency of the aforecited arsonic acids when used in conjunction with dimetridazole in the control of histomoniasis in turkeys. Depending upon the specific synergistic agent the potentiation effect will intensify in varying degrees. For example, while a dosage of at least 0.015% of dimetridazole alone is required to attain a survival ratio of 94%, one-half of that amount when combined with 0.0063 to 0.0083% of p-nitrobenzenearsonic acid suffices to produce an efficacy of 100% (C5, C4). One quarter of the optimum dose of dimetridazole or 0.0038% has no histomonicidal activity; when used in conjunction with 0.0125% of nitrobenzenearsonic acid the survival ratio rises to 63% (E3). Experiments C7 and C8 show the marked synergistic effect of p-ureidobenzenearsonic acid upon half of the top dose of dimetridazole or 0.0075% which by itself provides a survival rate of no more than 21%; combined with the activator this value increases to 75–100%. With arsanilic acid which alone in any practicable proportions is totally ineffective against Blackhead, survival ratios increase from 21% for the unsupported imidazole to 50–64% for the combination (C9, C10, C11).

As stated before, the potentiating effect of the synergists is not believed to be contingent upon their own histomonicidal properties. Being arsonic acids, it would not be entirely surprising in light of the present state of the art that certain of these chemicals show some degree of anti-protozoal activity. But whatever their efficacy in this respect may be, it does not detract from their function and value as potentiators when measured in reference to the comparative results obtained from their separate and combined dosages. That their synergism is not predicated upon an inherent histomonicidal activity is further evidenced by the fact that arsanilic acid at feed concentrations used in our experiments is devoid of any such property while in combination with dimetridazole it more than doubles the latter's efficacy in the control of Blackhead infection.

Our new compositions are principally, though not exclusively, intended for prophylactic purposes to prevent the eruption and spread of a latent infection and as such are to be fed on a continuous schedule. When, for instance, an impending outbreak of histomoniasis in a flock is suspected by reason of exposure or the sporadic appearance of clinical symptoms, the remedies are administered to the birds for approximately 3 weeks, but treatment may be extended for a longer period if the infection is of more serious nature. However, in case of a severe epizootic higher concentrations of our remedies than those recited in the examples may be employed for curative treatment.

A careful observation of the weights of the infected and treated poults in comparison with the uninfected and untreated controls reveals the further interesting fact that the synergistic combinations not only do not inhibit or retard the normal maturation process, but actually exert a stimulating effect upon the growth of the test animals. This effect has been found to be of the order of at least 5 to 15% over and above the weight gain ratios achieved by the disjoined use of the individual constituents. The synergistic benefit at the respective low dosage levels of the combinations is all the more remarkable since the morbidity caused by the infectious condition naturally tends to depress the growth below its normal rate. The newly discovered phenomenon that our compositions are capable of not only neutralizing, but even overcompensating that tendency renders them particularly suitable as feed additives for growth stimulation.

The preparation of our medicated feed compositions may be carried out by intimately mixing with and homogeneously dispersing the active components in an orally ingestible carrier material, such as feed, in amounts of approximately 5 to 99% by weight, and introducing proportionate quantities of these premixes into the bulk of a commercial feed ration with thorough stirring and shuffling until a uniform blend of even distribution at the desired concentration levels is obtained. Such formulations can be effected either by preparing two different premixes of the 5-nitroimidazole and the activator respectively, and introducing them separately into the feed, or by compounding one single concentrate of all the components for incorporation into the animal ration. Commercial feed rations employed to best advantage include the normal ingredients in a mash or scratch supplemented by desirable amounts of vitamins, trace minerals, antibiotics, other growth stimulants and preservatives. The premixes can also be produced by grinding a limited quantity of a non-nutritive, non-toxic and inert vehicle with an amount of 5 to 99% by weight of the drugs in their appropriate ratios. In this case the carrier material may consist of fuller's earth, talcum, bentonite, ground oyster shells, limestone, and divers clays. Finally, edible vehicles which are not complete feed rations may be utilized for this purpose, like soybean meal, wheat middlings and corn meal, and such stock concentrates are specifically made and adapted for use in dilution with a complete feed so as to compound the medicated rations at the desired dosage levels with utmost convenience. The availability of such concentrates as an article of commerce is therefore highly desirable, if not indispensable, for the feed manufacturer and poultry raiser who ordinarily uses one pound of premix or concentrate for each ton of commercial feed to produce the finished medicated ration.

A representative example of a synergistic premix combination in conformity with our invention is as follows:

|  | Pounds |
|---|---|
| Dimetridazole | 7.5 |
| p-Nitrobenzenearsonic acid | 6.3 |
| Bentonite | 36.2 |
|  | 50.0 |

One pound of this concentrate mixed with one ton (2,000 lb.) of a complete ration yields a dosage of 0.0075% dimetridazole and 0.0063% of p-nitrobenzenearsonic acid, corresponding to Example C5 in the foregoing table.

While the invention has been illustrated by the aforedescribed embodiments, it will be apparent that various equivalent changes and modifications may be resorted to without departing from the scope and spirit of the inventive concept as herein disclosed. For instance, compounds of closely analogous structure in relation to the chemicals herein exemplified may be used, and the described combinations may also be employed in conjunction with coccidiostats and bacteriostats known to the art within the limits of compatibility and tolerance which can be easily determined by any veterinarian.

What we claim is:

1. A synergistic composition for the treatment of poultry consisting of a non-toxic, orally ingestible carrier material which contains a mixture of 1,2-dimethyl-5-nitroimidazole and p-nitrobenzenearsonic acid in an approximate weight ratio between 0.5:5 to 9:5.

2. A synergistic composition for the treatment of poultry consisting of a non-toxic, orally ingestible carrier material which contains a mixture of 1,2-dimethyl-5-nitroimidazole and p-ureidobenzenearsonic acid in an approximate weight ratio between 1:5 to 4:5.

3. A synergistic composition for the treatment of poultry consisting of a non-toxic, orally ingestible carrier material which contains a mixture of 1,2-dimethyl-5-nitroimidazole and arsanilic acid in an approximate weight ratio between 4:5 to 15:5.

4. A poultry feed for the control of infectious enterohepatitis comprising approximately from 0.0025 to 0.0038% of 1-methyl-5-nitroimidazole and approximately from 0.0063 to 0.0125 of p-nitrobenzenearsonic acid.

5. A synergistic composition for the control of infectious enterohepatitis consisting of non-toxic, orally ingestible carrier material which contains a mixture of 1-methyl-5-nitroimidazole and p-nitrobenzenearsonic acid in an approximate weight ratio between 1:5 to 2:5.

6. A poultry feed for the control of infections enterohepatitis comprising approximately from 0.0019 to 0.0110% of 1,2-dimethyl-5-nitroimidazole and approximately from 0.0063 to 0.0188% of p-nitrobenzenearsonic acid.

7. A poultry feed for the control of infectious enterohepatitis comprising approximately 0.0075% of 1,2-dimethyl-5-nitroimidazole and approximately from 0.0094 to 0.0375% of p-ureidobenzenearsonic acid.

8. A poultry feed for the control of infectious enterohepatitis comprising approximately 0.0075% of 1,2-dimethyl-5-nitroimidazole and from 0.0025 to 0.0100% of arsanilic acid.

9. A composition suitable for addition to a poultry foodstuff comprising a non-toxic, inert, solid carrier and from about from 5 to 99% by weight of a synergistic combinatin as defined in any one of claims 1, 2, 3, 4, 5, 6, 7 and 8.

10. A method for the prevention and control of histomoniasis which comprises orally administering to poultry a synergistic combination as defined in any one of claims 1, 2, 3, 4, 5, 6, 7 and 8.

References Cited

UNITED STATES PATENTS

| | | | |
|---|---|---|---|
| 2,638,432 | 5/1953 | Morehouse et al. | 167—53.1 |
| 2,995,490 | 8/1961 | Brubaker et al. | 167—53.1 |
| 3,037,909 | 6/1962 | Rogers et al. | 167—53.1 |
| 3,065,133 | 11/1962 | Tchelitcheff | 167—53.1 |

ALBERT T. MEYERS, *Primary Examiner.*

S. FRIEDMAN, *Assistant Examiner.*

U.S. Cl. X.R.

424—297